US007991912B2

(12) United States Patent
Manapragada et al.

(10) Patent No.: US 7,991,912 B2
(45) Date of Patent: *Aug. 2, 2011

(54) LOAD BALANCING OF SERVER CLUSTERS

(75) Inventors: Srinivas Manapragada, Fremont, CA (US); Pritham Shetty, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/414,306

(22) Filed: Mar. 30, 2009

(65) Prior Publication Data

US 2009/0187662 A1    Jul. 23, 2009

Related U.S. Application Data

(63) Continuation of application No. 11/266,770, filed on Nov. 3, 2005, now Pat. No. 7,512,707.

(51) Int. Cl.
*G06F 15/173* (2006.01)
(52) U.S. Cl. ........................................ 709/240; 709/241
(58) Field of Classification Search .................. 709/240, 709/241
See application file for complete search history.

(56) References Cited

U.S. PATENT DOCUMENTS

| | | | |
|---|---|---|---|
| 5,991,808 A | 11/1999 | Broder et al. | |
| 6,055,564 A | 4/2000 | Phaal | |
| 6,128,279 A | 10/2000 | O'Neil et al. | |
| 6,442,550 B1 | 8/2002 | Rajamony | |
| 6,473,802 B2 * | 10/2002 | Masters | 709/229 |
| 6,574,612 B1 | 6/2003 | Baratti et al. | |
| 7,062,570 B2 | 6/2006 | Hong et al. | |
| 7,120,865 B1 | 10/2006 | Horvitz et al. | |
| 2002/0010783 A1 | 1/2002 | Primak et al. | |
| 2002/0049842 A1 | 4/2002 | Huetsch et al. | |
| 2002/0143965 A1 | 10/2002 | Aiken | |
| 2002/0198883 A1 | 12/2002 | Nishizawa et al. | |
| 2003/0055965 A1 | 3/2003 | Colby et al. | |
| 2003/0188013 A1 | 10/2003 | Nishikado et al. | |
| 2004/0197079 A1 | 10/2004 | Latvala et al. | |
| 2005/0204001 A1 | 9/2005 | Stein et al. | |
| 2006/0253453 A1 | 11/2006 | Chmaytelli et al. | |

OTHER PUBLICATIONS

"Using Outlook Web Access with Windows Load Balancing Service", Jul. 23, 2001, Microsoft.com.
Chen, Mingyu et al., "The Design of High Availability in the Dawning Server Consolidation System", Jan. 2000, IEEE.com.
Penchikala, Srini, "Clustering and Load Balancing in Tomcat, Part 1", Mar. 31, 2004, Onjava.com.

* cited by examiner

*Primary Examiner* — Philip J Chea
(74) *Attorney, Agent, or Firm* — Fish & Richardson P.C.

(57) ABSTRACT

A load balancing scheme is described for a server cluster. An application identifier is received by the cluster from a client desiring to connect to the application. Each one of the servers in the cluster independently hashes the application identifier into a unique number. This unique number is used to determine a preferred one of the servers for the connection. The servers then each calculate a priority code using the unique number, a load level for each server, and/or a node identifier assigned to the servers in the cluster. If the preferred cluster server is available, it transmits its priority code to the client before the other servers transmit their priority codes. Otherwise, each of the available cluster servers transmits their priority codes to the client. The client selects the cluster server with the most favorable priority for making the connection.

15 Claims, 4 Drawing Sheets

LOAD BALANCING OF SERVER CLUSTERS

CROSS-REFERENCE TO RELATED APPLICATIONS

This Application is a Continuation of application Ser. No. 11/266,770 "LOAD BALANCING OF SERVER CLUSTERS" filed on Nov. 3, 2005, now U.S. Pat. No. 7,512,707, issued on Mar. 31, 2009. Application Ser. No. 11/266,770 is related to U.S. patent application Ser. No. 11/263,652 entitled "NETWORK CONFIGURATION WITH SMART EDGE SERVERS" filed on Oct. 31, 2005.

TECHNICAL FIELD

The present invention relates, in general, to distributed computer networks, and, more specifically, to load balancing of server clusters.

BACKGROUND

In the realm of computing, the relationship that drives most useful distributed applications is the client-server relationship. The interaction between client and server allows most computing beyond an unconnected, single computer. The client-server relationship defines an architecture in which a user's computer, which may be a personal computer (PC), may be the client machine or entity requesting something from a server, which is the supplying machine or entity. However, a PC may also operate as the server side of the client-server relationship. Both are typically connected via some kind of network, such as a local area network (LAN) or wide area network (WAN).

In the client-server model, the client typically processes the user interface (WINDOWS™, MACINTOSH™, etc.) and may perform some or all of the application processing. Servers may range in capacity from high-end PCs to mainframes. A database server typically maintains databases and processes requests from the client to extract data from or to update the database. An application server, which is a software server, typically provides additional business processing for the clients.

While many client-server models are now commonly referred to as "Web based" and/or "Web enabled," the architecture is conceptually the same. Users' PCs may still be clients, and there are tens of thousands of Web servers throughout the Internet delivering Web pages and other functionality. On the Web, the client typically runs the browser and, just like legacy client/server systems, can perform a little or a lot of processing, such as simply displaying hypertext mark-up language (HTML) pages, processing embedded scripts, or considerable processing with JAVA™ applets. A myriad of browser plug-ins provide all sorts of possibilities for client processing.

FIG. 1 is a block diagram illustrating typical client-server system 10. Server 100, which may be a network server, a Web server, or the like, hosts a remote application that is available to clients 101-104. As each of clients 101-104 desires to access the remote application, a connection is made between the client and server 100. The client, such as client 101, issues a request to server 100 to access the remote application. Server 100 activates the remote application, performs whatever logic calculations the remote application is designed to perform and then transmits the results back to client 101. This relationship is a request-response relationship. For example, if server 100 is a Web server and client 101 is a Web browser. The user at client 101 enters a Web address into client 101. Client 101 issues a request for the page index for the Web address to server 100. When server 100 receives the request, it processes the necessary logic to create the Hypertext Markup Language (HTML) file the makes up the requested Web page, or accesses the stored HTML file, and transmits it back to client 101. Client 101 then displays the HTML file to the user.

In order to accommodate a growing load of accessing clients on a single-server, client-server network, edge or proxy server networks were developed. Edge or proxy server networks typically deploy additional servers that maintain high speed communication with the main server, but that are located in remote areas closer to the clients. The remote servers' role is to take the load from the central server and distribute it closer to the clients. This addition of remote servers allows for a greater increase in the number of potential clients capable of accessing the network, thus, increasing the capacity of any given network. Content Delivery Networks (CDN) typically employ servers on the edges of the network. These servers, referred to typically as edge servers maintain copies of the content that can be regionally distributed to the clients within that edge server's region. Thus, a client in Dallas, Tex. accessing a music downloading system, that employs an edge-driven CDN, may download a particular song from an edge server located in Austin, Tex., while a client in San Francisco, Calif., of the same music downloading system may download the same song from an edge server located in Palo Alto, Calif. Both clients access the same system, using the same Uniform Resource Locator (URL), but then download the content from regionally different edge servers.

One such CDN is operated by AKAMAI TECHNOLOGIES, INC. AKAMAI employs its EDGESUITE™ Delivery Service to provide localized delivery of content, to more-efficiently manage a content deliver system. In application, the edge servers in the CDN each store copies of the available content. Thus, when a local client requests a particular document from the central system, the local edge server will be tasked with delivering that content. This system relieves the central system from performing too much copying and delivering, which may adversely affect the bandwidth or efficiency performance of the central system.

FIG. 2 is a block diagram illustrating edge network 20. When employed as a CDN, the central access point is maintained by central server 200, while edge servers 201 and 202 each have a copy of the content that is available through the CDN. Depending on their location, clients 203-208 may access the content through local, edge servers 201 or 202. For example, clients 203-205 access the CDN through edge server 201, while clients 206-208 access through edge server 202. If client 206 wishes to obtain a piece of content, it negotiates with central server 200 for the content, which may be downloaded through edge server 202. If client 205 wishes to obtain the same piece of content, it also negotiates for the content with central server 200, which may be downloaded through edge server 201. By relieving central server 200 of the tasks of streaming the data for the content to both clients 205 and 206, it is free to server more of the clients directly in negotiating for content.

FIG. 2 may also represent a multi-server collaboration system of the type operated by WEBEX™. WEBEX™ uses multiple servers to manage and maintain its electronic meetings. Because of its proprietary network, it is more easily capable of managing a single meeting over multiple servers. For example, a copy of everything supporting an electronic meeting may be stored on each of central server 200 and edge servers 203-208. Thus, as client 208 logs into edge server 202 to join the single electronic meeting with clients 203-207, its participation in the meeting is managed by edge server 202. Similarly, client 204, logs onto the meeting through edge server 201. Both of clients 204 and 208 are participating in the same meeting. However, the meeting is managed by both edge servers 201 and 202. Another client (not shown) may even connect directly to central server 200 to participate in the meeting because central server 200 also maintains a copy of all of the information necessary to run the meeting.

In some situations, a particular geographic area may have more clients attempting access to an associated edge or proxy server than other areas. This may be due to the fact that the remote server services an entire company or a larger population area, or the like. Thus, the remote edge server assigned to this location may become overloaded, thus, affecting performance and efficiency of the distributed network. One solution developed to ease this overload problem is server clusters.

A server clusters is a group of servers that, together, create the remote edge server. As clients access the remote server, they are assigned to one of the servers in the cluster. That particular cluster server would serve the accessing client as the single edge server would have. Thus, it would cache the appropriate data streams or applications for serving to the client.

Because multiple servers in the cluster are used to service multiple accessing clients, the load to the cluster should be balanced in order to make the most efficient use of the cluster. Typically, an algorithm is employed that balances the load evenly among the various cluster servers. Therefore, no one of the servers in the cluster is loaded to its maximum effectiveness much earlier than any of the other cluster servers. Each one is evenly loaded. If the client population continues to expand, the cluster is scalable simply by adding additional servers to the cluster.

In many server clusters, a considerable amount of administration is used to maintain the relationship between the cluster servers. Thus, as a new server is added to the cluster, various installation procedures are run to coordinate the server with the rest of the cluster. Similarly, if a cluster server goes down, the clients accessing that cluster server may or may not be able to easily re-establish a connection to another server in the cluster. This tight coupling between the servers in the cluster may add to inefficient operation and operation that becomes a conspicuous process to one of the accessing clients, thus, diminishing the overall user experience.

BRIEF SUMMARY

The present invention is directed to a system and method for balancing the load of a server cluster in a loosely coupled fashion. By loosely coupling the server cluster, the system and method of various embodiments of the present invention allow for a robust server cluster that can flexibly handle various situations in which servers in the cluster are added, go down, or are fully loaded or approaching a full load. The representative server clusters using the embodiments of the load balancing scheme also provide efficient balancing of applications that benefit from connection stickiness.

In operation, a client desiring to connect into a distributed application through the server cluster sends a connection request to the cluster that includes the identifier for the desired application. The cluster distributes this message to each of the servers in the clusters. Each such server independently hashes the application identifier to come up with a unique number representing that application identifier. The hash algorithm results in the same unique number for the same application identifier regardless of which client transmits the application identifier. Using that unique number, the servers determine which of them will be the preferred connection point for the client. Each of the servers in the cluster is assigned or selects a node identifier or number. This node ID is used in selecting the particular server that the client will use for connecting to the desired application. For example, if there are N servers in the cluster, a modulus operation may be used on the unique number to normalize or standardize it into a resulting number from 0 to N. Thus, by performing the modulus operation on the unique number, the normalized number will correspond to one of the node numbers.

Each of the servers then calculates a priority code which, depending on the specific embodiment of the present invention, may use one or more of the unique number hashed from the application identifier, the preferred node name, the total number of servers in the cluster, a load level for the servers, or other similar such parameters. Thus, the priority code may represent not only the preferred node name, but also the load of each individual server. Once the priority code is calculated, each of the servers sends the priority code to the client. In situations where the preferred server, corresponding to the preferred node name, is available to make a connection, it transmits its priority code first, as soon as it is calculated. The other non-preferred servers wait a predetermined amount of time to send their priority codes. The client will store the priority codes for each of the servers that send their transmission within a predetermined window of time after receiving the first priority code. The client will select the server that has the most beneficial priority code that is received during that window. Using this procedure, the likelihood is that the client will accept connection through the preferred server.

It should be noted that if the load has increased substantially on the preferred server, its load level will affect the desirability of its priority code. Therefore, even though it is the preferred server, it may not have the most beneficial priority code received by the client during the messaging window. In that case, the client will select to connect using the more beneficial server even though that server is not the preferred server.

If the preferred server is completely unavailable, either because it is down or has reached its maximum load, the client will still select the server based on the most beneficial priority code that is received during the window. However, because the preferred server is down or is fully loaded, it will not have transmitted its priority code. Thus, the client will still be serviced by one of the available servers without too much delay. The combination of these procedures results in a robust balancing mechanism that flexibly handles all server situations, from adding new servers, removing servers, having servers go down, or when servers are becoming congested.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
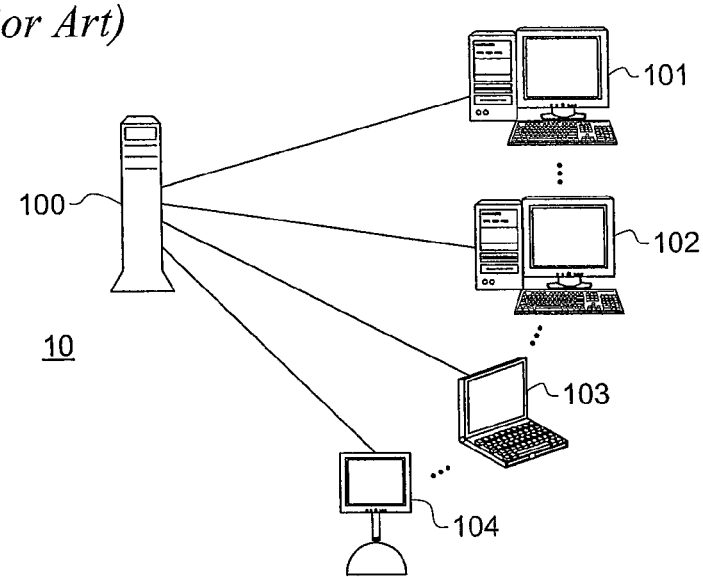
FIG. 1 is a block diagram illustrating a typical client-server system.
Figure 2:
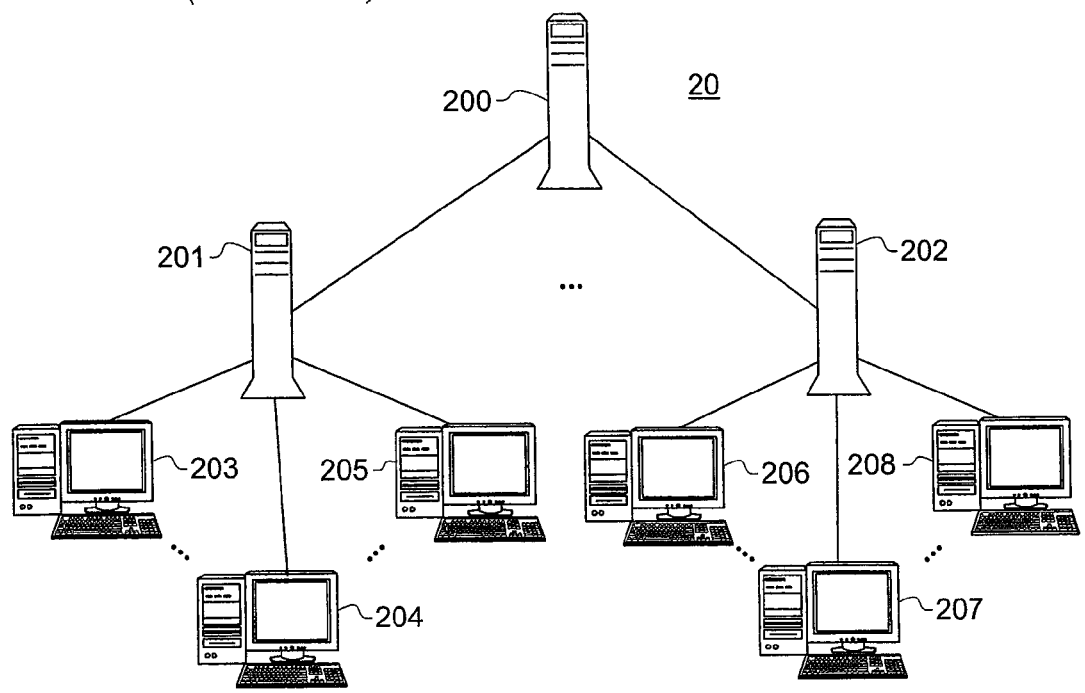
FIG. 2 is a block diagram illustrating a typical edge network.

During the early days of the Internet, its client-server architecture was used as a communications system funded and built by researchers for military use. This Internet, originally known as ARPANET, was embraced by the research and academic communities as a mechanism for scientists to share and collaborate with other scientists. This collaborative network quickly evolved into the information superhighway of commerce and communication that has been a key part of personal and business life in the last 5-10 years. The Internet explosion was due, in part, to the development of the Web and graphically-based Web browsers, which facilitated a more graphically-oriented, multimedia system that uses the infrastructure of the Internet to provide information in a graphical, visual, and interactive manner that appeals to a wider audience of consumers seeking instant gratification.

As the technology underlying transmission bandwidth has grown in conjunction with the accessibility to such increasing transmission bandwidth, a new paradigm for the old idea of Internet collaboration is emerging that takes advantage of the modern graphical, visual world. This new paradigm is also driven by the advance in real-time or time-sensitive data transmission technology, such as Voice over Internet Protocol (VoIP) technology, and the like. Non-Internet videoconferencing, which has generally not been able to completely supplant teleconferencing as a viable means for reliable communications, is slowly fading away in favor of Internet-driven technology, such as collaborative electronic meetings. Services, such as WEBEX COMMUNICATIONS, INC.'S, WEBEX™ electronic meeting or collaboration services offer the ability for users to connect, at least initially, across the Internet to share voice, video, and data in real time for meetings, presentations, training, or the like.

In such collaborative meeting environments, a virtual meeting room typically is made up of several meeting objects which are generally containers for presentation information, such as slides, video, audio, documents, computer applications, and the like, that are themselves contained within the container of the meeting room. These meeting objects are typically placed into a static arrangement on the actual electronic meeting interface. Therefore, chat objects may be set on the bottom right of each meeting interface screen, while slide or other main presentation objects are set on the left half of each meeting interface screen. Once the meeting begins, each of the meeting participants, both presenters and viewers, usually see the same static meeting interface with the presenters information loaded thereon.

One example of an electronic collaboration application and system is MACROMEDIA INC.'s BREEZE™ rich Internet communication system (RICS). A RICS system is an application and its underlying infrastructure that implements an electronic collaboration system that shares and collaborates multimedia information, such as audio, video, and data. Because of the collaboration of such multimedia information in a real-time system, it is advantageous to manage any particular electronic meeting on a single computer or collaboration server. However, managing an electronic meeting on a single collaboration server provides a finite limit to the number of meeting participants that may experience the electronic meeting. Technology has been suggested that uses smart edge servers to increase the scalability of such collaborative meetings, while maintaining ultimate management in a single, origin or central server. This technology is disclosed in commonly-assigned, co-pending U.S. patent application Ser. No. 11/263,652, entitled, "NETWORK CONFIGURATION WITH SMART EDGE SERVERS," the disclosure of which is incorporated herein by reference.

In such collaborate systems, and other similar system, the management of the application exhibits stickiness with regard to the edge server servicing the client. That is, in the BREEZE™ application operating with smart edge servers, the system is more efficient when clients accessing the same meeting are serviced from the same edge server. This is because the edge server caches content and data from the meeting as well as controls the dissemination of streaming data and manages all of the client communications to the origin meeting server. Adding a typical server cluster to this type of smart edge network would decrease the efficiency and benefit obtained from the smart edge server because multiple servers in the cluster would be caching the same content when such duplicative caching was not absolutely necessary.

Figure 3:
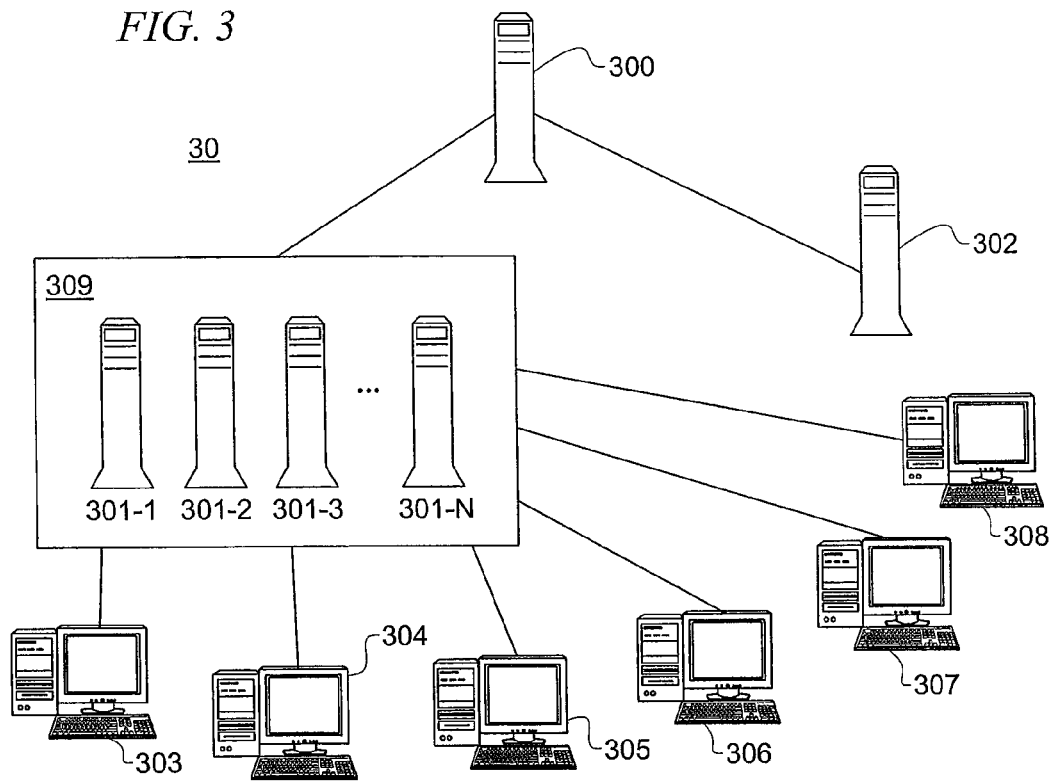
FIG. 3 is a block diagram illustrating a distributed network including a cluster configured according to one embodiment of the present invention.

FIG. 3 is a block diagram illustrating distributed network 30 including cluster 301 configured according to one embodiment of the present invention. Origin server 300 manages one or more distributed applications in which session stickiness assists in more-efficient operation. Distributed network 30 is assisted in administration by edge cluster 301 and edge server 302. Clients 303-308 access one of the distributed applications managed by origin server 300 through cluster 301. Cluster 301 contains a variable number of servers, depending on how many the controlling entity desires or can afford to deploy. Custer 301, as depicted, includes cluster servers 301-1-301-N, where 'N' is the final number of servers deployed.

For purposes of example, clients 303-305 each connect to distributed application A (DA-A), while clients 306-308 each connect to distributed application B (DA-B), both managed by origin server 300. Instead of creating static application assignments for each of cluster servers 301-1-301-N, which can result in overloading a single one of cluster servers 301-1-301-N, cluster 301 dynamically distributes clients 303-308 to appropriate servers within cluster 301. Using the application designation, the cluster server identifier, and the load state of the cluster server, each of cluster servers 301-1-301-N calculates a priority number or code which is communicated to each of clients 303-308. Clients 303-308 analyze each priority number or code to select the highest or most-beneficial priority cluster server. In operation, clients 303-305 may all receive the highest or most-beneficial priority codes from cluster server 301-1. Clients 303-305 would then select to connect to cluster server 301-1. Clients 306-308 may all receive the highest or most-beneficial priority codes from cluster server 301-3. Thus, clients 306-308 would select to connect to cluster server 301-3. By considering these factors in determining a priority number or code, cluster 301 can dynamically and evenly distribute clients to various ones of cluster servers 301-1-301-N.

Figure 4:
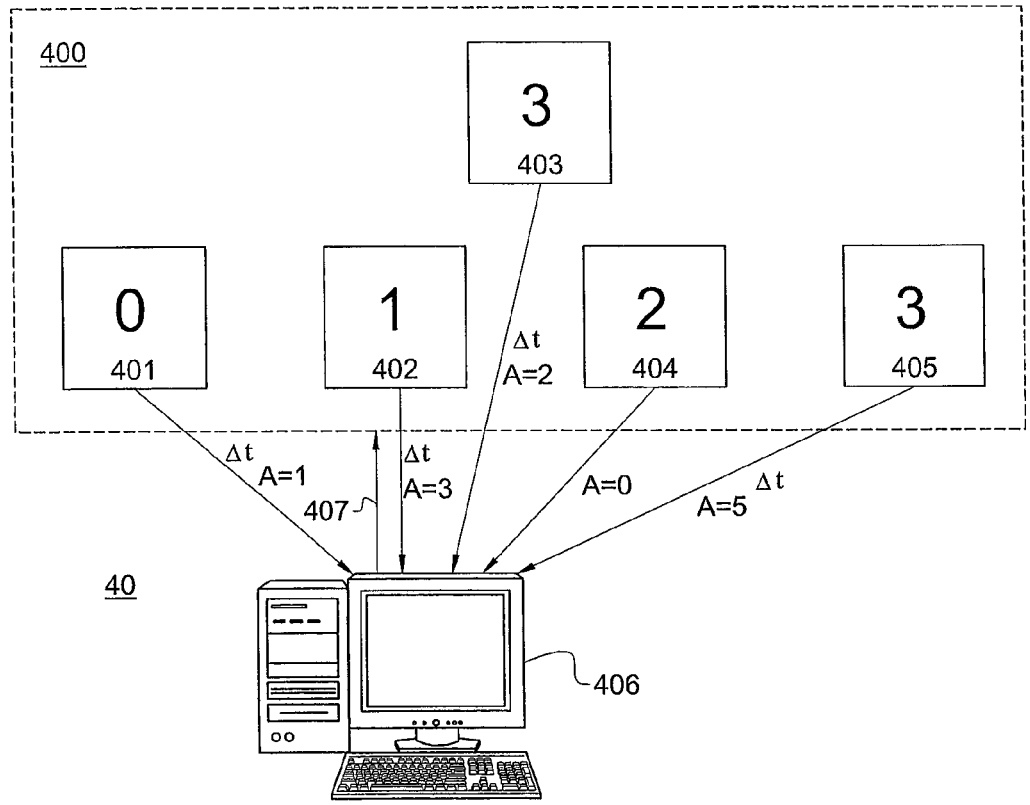
FIG. 4 is a block diagram illustrating a cluster connection with a server cluster configured according to one embodiment of the present invention.

FIG. 4 is a block diagram illustrating a cluster connection with server cluster 400 configured according to one embodiment of the present invention. Each of cluster servers 401-405 are assigned a node identifier when that cluster server is added to cluster 400, i.e., node IDs 0, 1, 2, 3, and 3, respectively. When client 406 desires to connect to a distributed application, it issues broadcast message 407 to cluster 400 indicating the identifier for the distributed application it wishes to connect to. Cluster 400 delivers broadcast message 407 to each of cluster servers 401-405. Each of cluster servers 401-405 then independently calculates the priority code. As a part of the calculation, the distributed application identifier received from client 406 is hashed down to a unique number. Thus, the same distributed application identifier will result in the same unique number. Depending on the hash formula, cluster servers 401-405 performs a modulus operation on the unique number to arrive at a number from 0 to N, where N is the number of cluster servers within cluster 400. The resulting number represents the preferred cluster server for handling client 406's request. This procedure of using the hash of the distributed application identifier will typically result in an even distribution among different distributed application identifiers. The priority number also includes consideration of the particular cluster server's load. Thus, if the preferred cluster server is nearing its maximum load, it will either decrease its priority code or determine that it will not respond to client 406 at all.

In example operation, it is assumed for the example that each of cluster servers 401-405 are operating under a normal load and that cluster server 404, with a node identifier of 2, is the preferred cluster server for client 406. When cluster server 404 calculates the priority code, it realizes that it is the preferred cluster server. It will immediately send a message to client 406 that it is capable of handling client 406's request and also includes its priority code. To create more flexibility and robustness in the connection process, cluster servers 401-403, and 405 also send a message to client 406 stating that they are also capable of handing the request. However, the messages sent by cluster servers 401-403, and 405 are sent at a slightly delayed time from cluster server 404. Therefore, at Δt after cluster server 404 sends its message, cluster servers 401-403, and 405 send their messages. Because, in normal operation, the message from cluster server 404 should reach client 406 first, client 406 may select cluster server 404 before receiving all of the other messages.

In order to maintain a loosely coupled, flexible and robust cluster, even though the priority code calculation considers one of the cluster servers as the preferred server, each of the cluster servers is capable of handling any connection for any of the associated clients. Therefore, if the preferred cluster server is increasingly loaded, has reached its maximum capacity, or has gone down completely, the clients can be served by the other cluster servers. The messaging procedure described above facilitates the connection of the requesting client. For purposes of this example, it is assumed that cluster server 404 is unavailable for further connections for some reason. Because no cluster server calculates the hash as the preferred cluster server, none of cluster servers 401-403, and 405 send an immediate message. However, as client 406 receives the first message from one of the cluster servers, a window of time is started. Within that predefined window, client 406 collects each of the response messages and determines which of those responses is the highest priority. Client 406 will then select the cluster server with the highest priority.

In example operation, client 406 issues broadcast message 407 requesting access to a particular distributed application. Client 406 receives a response message from cluster server 402 first. This message from cluster server 402 starts the time clock for the message window on client 406. Before the end of this window, client 406 also receives the response message from cluster server 405. Client 406 will then compare the priority code of the response messages. In the described embodiment, the priority code is represented by an affinity number. The affinity number is the code that takes into account the distributed application identifier hashed down to a unique number, then converted to a finite number using a modulus, wherein that finite number corresponds to one of the cluster servers in the cluster, and then further considering the load on that particular server. In the described example, the lower the affinity number, the higher the priority. Thus, a 0 affinity would be equivalent to the highest priority. Cluster server 402 sent a priority code of a=3, while cluster server 405 sent a priority code of a=5. Client 406 would select to connect through cluster server 402 because it had the lower affinity number (i.e., the higher priority).

It should be noted that in additional and/or alternative embodiments of the present invention, any method for reflecting priority or affinity may be used. For example, the most beneficial priority or affinity may be the highest number or the lowest number depending on the particular embodiment or formula used for calculating the priority code. The various embodiments of the present invention are not limited to one way or another.

The load balancing algorithm used by the various embodiments of the present invention allow a beneficial network performance for cluster servers that either fail or that are added to the cluster. Because the cluster is loosely coupled, there is enough flexibility for each cluster server to step up to operation when needed, regardless of whether it is the preferred server or not.

A cluster, such as cluster 400, conducts back-end administration of cluster servers 401-405. When each cluster server is added to cluster 400, it sends a message to the other cluster servers that it is joining cluster 400. Each of the existing cluster servers will then send a message to the new cluster server identifying what node number it is. The new cluster server will then select a node number and broadcast that out to the other cluster servers. In this manner, each of the cluster servers can keep track of how many servers are in cluster 400 total.

It should be noted that in various alternative and/or additional embodiments of the present invention, the new server may select its node identifier before sending the initial broadcast. Therefore, as a part of the initial broadcast, the new server will include its node ID.

For example, cluster 400 begins with cluster servers 401, 402, 404, and 405. Cluster server 403 is, thereafter, added to cluster 400. When it is installed, it sends out a message to cluster servers 401, 402, 404, and 405 that it is being added to cluster 400. In response, cluster servers 401, 402, 404, and 405 send messages to cluster server 403 identifying each one's node number. Cluster server 403 sends a message to each of cluster servers 401, 402, 404, and 405 that it has selected node number '3' as its designator. This selection is made even though cluster server 405 is already designated node number '3.' The load balancing provided by the various embodiments of the present invention can handle duplicate node numbers because of its design.

In example operation, client 406 requests to join a distributed application, such as an electronic meeting in an electronic collaboration system. The designator of the electronic meeting hashes down to a finite number, '3.' Cluster servers 403 and 405, having calculated the hash value that corresponds to both being the preferred servers, immediately send the response message to client 406. Client 406 can only receive one response message at a time. If both cluster servers 403 and 405 are equally loaded, then client 406 will select the one of cluster servers 403 and 405 whose message was received first. Otherwise, client server 406 will select the one of cluster servers 403 and 405 whose priority is highest or most-beneficial. Thus, the described embodiment of the present invention will self-resolve any apparent conflicts caused by repeated node numbers.

Figure 5:
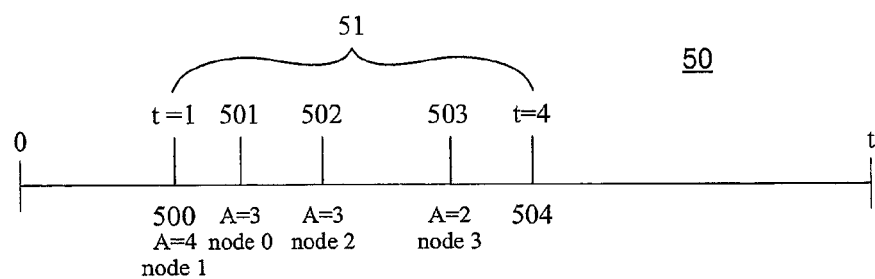
FIG. 5 is a timeline illustrating a message window resulting in operation of a cluster server configured according to one embodiment of the present invention.

FIG. 5 is a timeline illustrating message window 51 resulting in operation of a cluster server configured according to one embodiment of the present invention. At time t=1, the requesting client receives a response message from node 1 indicating an affinity number of 4. In the described embodiment, node 1 is the preferred cluster server for serving this client. However, node 1 is experiencing a heavy load. Therefore, node 1 has increased its affinity number to reflect that it is not the best candidate server. Upon receiving this first message, message window 51 is started and will last for 3 more time units. At time 501, the client receives the response message from node 0 indicating an affinity of 3. At time 502, the client receives the response message from node 2 indicating an affinity of 3. Finally, at time 503, the client receives the response message from node 3 indicating an affinity of 2. At time 504, t=4, which ends message window 51. The client will then compare the different affinity numbers and eventually select node 3 as the server to provide the connection, even though node 1 is the preferred node/cluster server. Therefore, the loosely coupled cluster allows for the clients to be more-efficiently serviced without unnecessarily overloading the other cluster servers.

Figure 6:
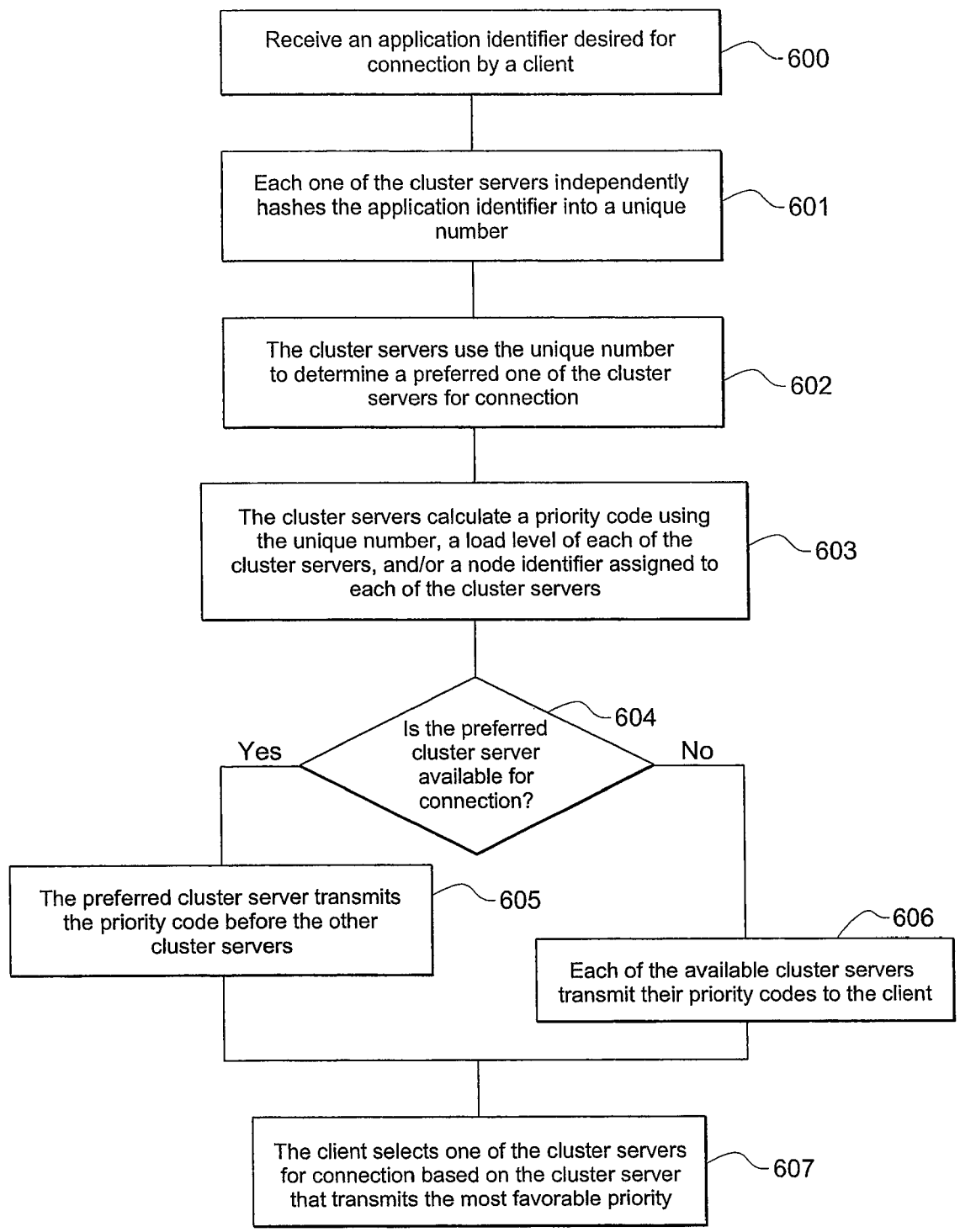
FIG. 6 is a flowchart illustrating example steps executed in implementing one embodiment of the present invention.

FIG. 6 is a flowchart illustrating example steps executed in implementing one embodiment of the present invention. In step 600, an application identifier is received by a server cluster from a client desiring to connect to the related application. Each one of the cluster servers independently hashes the application identifier into a unique number in step 601. The cluster servers use the unique number, in step 602, to determine a preferred one of the cluster servers for connection. The cluster servers calculate a priority code, in step 603, using the unique number, a load level of the each of the cluster servers, and/or a node identifier assigned to each of the cluster servers. In step 604, a determination is made whether the preferred cluster server available for connection. If the preferred cluster server is available, it transmits its priority code to the client, in step 605, before the other cluster servers transmit their priority codes. Otherwise, each of the available cluster servers transmit their priority codes to the client in step 606. The client selects one of the cluster servers for connection, in step 607, based on the cluster server that transmits the most favorable priority.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 7:
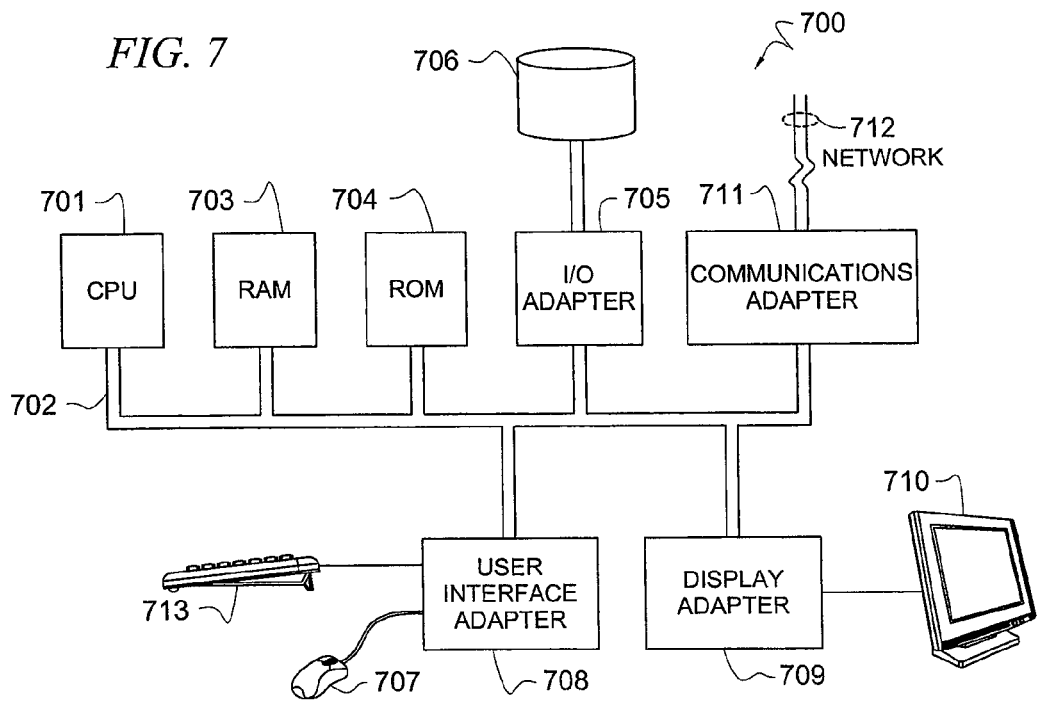
FIG. 7 illustrates a computer system adapted to use embodiments of the present invention.

FIG. 7 illustrates computer system 700 adapted to use embodiments of the present invention, e.g. storing and/or executing software associated with the embodiments. Central processing unit (CPU) 701 is coupled to system bus 702. The CPU 701 may be any general purpose CPU. However, embodiments of the present invention are not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) controller card 705, communications adapter card 711, user interface card 708, and display card 709. The I/O adapter card 705 connects storage devices 706, such as one or more of a hard drive, a CD drive, a floppy disk drive, a tape drive, to computer system 700. The I/O adapter 705 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 711 is adapted to couple the computer system 700 to a network 712, which may be one or more of a telephone network, a local (LAN) and/or a wide-area (WAN) network, an Ethernet network, and/or the Internet network. User interface card 708 couples user input devices, such as keyboard 713, pointing device 707, and the like, to the computer system 700. The display card 709 is driven by CPU 701 to control the display on display device 710.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer implemented method comprising:
receiving a request at a first server of a plurality of servers making up a server cluster, wherein said request originates from a first client of a plurality of clients requesting to connect to one of a plurality of distributed applications serviced by said server cluster, and wherein said request includes an identifier of said one of said plurality of distributed applications;
calculating, by said first server, a priority code of said first server using said identifier, wherein said calculating comprises
hashing said identifier into a unique number,
normalizing said unique number to result in a number within a range of a plurality of node numbers labeling each of said plurality of servers,
comparing said resulting number to each of said plurality of node numbers,
responsive to said comparing, identifying preferred ones of said plurality of servers, wherein said preferred ones have one of said plurality of node numbers that match said resulting number, and
setting said priority code of said first server equal to said resulting number;
transmitting, by said first server, said priority code of said first server to said first client; and
connecting said first server to said first client, wherein selection of said first server for said connecting is based on said first client finding said priority code of said first server more favorable than one or more additional priority codes of respective one or more remaining servers of said plurality of servers calculated by said respective one or more remaining servers of said plurality of servers and received by said first client.

2. The computer implemented method of claim 1 further comprising:
responsive to said first server not being one of said preferred ones, delaying said transmitting for a predetermined period of time prior to a start of said transmitting.

3. The computer implemented method of claim 1 further comprising:
receiving a message at said first server broadcast from a new server added to said server cluster, wherein said message identifies a node number selected by said new server; and
transmitting a response from said first server to said new server identifying said node number assigned to said first server.

4. The computer implemented method of claim 1 wherein said calculating comprises
reflecting a load intensity value of said first server into said normalized unique number to result in said priority code of said first server, wherein said one or more additional priority codes of said respective one or more remaining servers of said plurality of servers reflect one or more load intensity values corresponding to said respective one or more remaining servers of said plurality of servers.

5. The computer implemented method of claim 1 further comprising:
receiving, at said first client, said priority code of said first server;
responsive to said receiving said priority code of said first server, beginning a predefined time window; and
storing each one of said priority code of said first server and said one or more additional priority codes of said respective one or more remaining servers of said plurality of servers received during said predefined time window, wherein said selecting is performed based on each of said stored each one.

6. A computer implemented method comprising:
receiving an application identifier at a first server of a plurality of servers making up a server cluster, wherein said application identifier identifies an application served by said server cluster, and wherein said application identifier is received from a client requesting to access said application;
hashing said application identifier, at said first server, into a unique number;
comparing, by said first server, said unique number to a list of node identifiers identifying each of said plurality of servers;
responsive to said comparing, identifying, by said first server, a preferred server of said plurality of servers based on said unique number matching ones of said list of node identifiers;
calculating, by said first server, a priority code of said first server using said unique number and one or more of:
a load level of said first server; and
a node identifier assigned to said first server; and
transmitting, by said first server in response to the identified preferred server being different from said first server, said priority code of said first server to said client after expiration of a predefined period of time prior to a start of said transmitting.

7. The computer implemented method of claim 6 further comprising:
selecting, at said client, to connect to said preferred server, wherein said client receives a preferred priority code of the preferred server first, said preferred priority code being a first received of one or more additional priority codes of respective one or more remaining servers of said plurality of servers calculated by said respective one or more remaining servers of said plurality of servers.

8. The computer implemented method of claim 6 wherein a modulus operation is performed, by said first server, on said unique number to result in a node number selected from said list of node identifiers assigned to said plurality of servers.

9. The computer implemented method of claim 6 further comprising:
receiving a message at said first server broadcast from a new server added to said server cluster, wherein said message identifies a new node identifier selected by said new server; and
transmitting a response from said first server to said new server identifying a first node identifier assigned to said first server.

10. A computer implemented method comprising:
sending, by a client system to a server cluster including two or more server systems, a request to connect to an application serviced by the server cluster, the request including an identifier of the application;
receiving, by the client system from a first server system of the server cluster in response to said sending, a first priority code of the first server system calculated by the first server system based at least in part on a load level of the first server system;
starting a messaging window time at said client system upon receipt of the first priority code of the first server system;
receiving, during the messaging window time by the client system from respective one or more remaining server systems of the server cluster in response to said sending, one or more additional priority codes of the respective one or more remaining server systems calculated by the respective one or more remaining server systems based at least in part on respective load levels of the one or more remaining server systems;

storing each of said first priority code of the first server system and said one or more additional priority codes of the respective one or more remaining server systems received by said client system during said messaging window time; and selecting one server system of said server cluster through which said client system will connect to said application based on one of said stored first priority code of the first server system and said stored one or more additional priority codes of the respective one or more remaining server systems having a most favorable priority.

11. The computer implemented method of claim 10 wherein said client system selects said first server system when each of said stored first priority code of the first server system and said stored one or more additional priority codes of the respective one or more remaining server systems is equivalent.

12. The computer implemented method of claim 10, wherein said sending the request to the server cluster includes sending the request by the client system to each server system of the server cluster, and wherein the request further includes an indication of a preferred server system from the server cluster.

13. A system comprising:
a server cluster having a plurality of servers, wherein each of said plurality of servers comprises:
 a communications adapter configured to receive a request originating from a client to connect to one of a plurality of distributed applications serviced by said server cluster, wherein said request includes an identifier of said one of said plurality of distributed applications; and
 a central processing unit (CPU) configured to calculate a priority code of an associated server based on said identifier, wherein to calculate the priority code the CPU is configured to
 hash said identifier into a unique number,
 normalize said unique number to result in a number within a range of numbers comprising a list of node identifiers assigned to each of said plurality of servers,
 compare said resulting number to each node identifier in said list of node identifiers
 identify preferred ones of said plurality of servers, wherein said preferred ones have one of a plurality of node numbers that match said resulting number, and
 set said priority code of the associated server equal to said resulting number;
 wherein said communications adapter is further configured to
 transmit said priority code of the associated server to said client and
 connect said client to said one of said plurality of distributed applications using one of said plurality of servers selected by said client based on a most favorable priority code associated with the selected server received by said client.

14. The system of claim 13 wherein when ones of said plurality of servers are not identified as preferred ones, said CPU is further configured to delay transmission of said priority code of the associated server by said communication adapter for a predefined period of time prior to a start of said transmission.

15. The system of claim 13 wherein said server cluster further comprises:
a new server installed among said plurality of servers, wherein a new communications adapter of said new server is configured to
 broadcast a message from said new server to said plurality of servers identifying a new node identifier selected by said new server, wherein said new communications adapter is further configured to
 receive a response from each of said plurality of servers identifying a node identifier assigned to each of said plurality of servers.

* * * * *